(12) United States Patent
Chang et al.

(10) Patent No.: US 7,539,147 B2
(45) Date of Patent: May 26, 2009

(54) APPARATUS AND METHOD FOR DETECTING AND VISUALIZING ANOMALIES IN NETWORK TRAFFIC

(75) Inventors: Beom Hwan Chang, Daejeon (KR); Soo Hyung Lee, Daejeon (KR); Jin Oh Kim, Daejeon (KR); Jung Chan Na, Daejeon (KR); Jong Soo Jang, Daejeon (KR); Sung Won Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 789 days.

(21) Appl. No.: 11/077,638

(22) Filed: Mar. 11, 2005

(65) Prior Publication Data
US 2006/0098579 A1    May 11, 2006

(30) Foreign Application Priority Data
Nov. 10, 2004    (KR)    ........... 10-2004-0091573

(51) Int. Cl.
*G01R 31/08*    (2006.01)
(52) U.S. Cl. .......... 370/242; 370/229; 382/106
(58) Field of Classification Search ........ 370/242, 370/241, 229; 382/106
See application file for complete search history.

(56) References Cited

U.S. PATENT DOCUMENTS

2007/0214504 A1*  9/2007  Milani Comparetti et al. . 726/23

FOREIGN PATENT DOCUMENTS

| KR | 1020040072365 |   | 8/2004 |
| KR | 1020040072365 A | * | 8/2004 |

OTHER PUBLICATIONS

Mihui Kim, A Combined Data Mining Approach for DDOS Attack Detection, Spring-Verlag Berlin Heidelberg, ICOIN 2004, 943-950.*
"Real-time Visualization of Network Attachs on High-Speed Links", H. Kim, et al., 2004 IEEE, Sep./Oct. 2004, pp. 2-12.

* cited by examiner

*Primary Examiner*—Ricky Ngo
*Assistant Examiner*—Kibrom T Hailu
(74) *Attorney, Agent, or Firm*—Blakely, Sokoloff, Taylor & Zafman LLP

(57) ABSTRACT

Provided is an apparatus for detecting and visualizing anomalies in network traffic which includes a traffic information storing portion storing information on network traffic, a traffic state display portion presenting a status of the network traffic generated for a predetermined threshold time based on the information on network traffic on an orthogonal coordinates system in a form of a graph connecting at least one point data as a coordinate value, and a traffic anomalies determination portion determining an existence of anomalies in the network traffic based on a shape of the graph.

9 Claims, 4 Drawing Sheets

APPARATUS AND METHOD FOR DETECTING AND VISUALIZING ANOMALIES IN NETWORK TRAFFIC

BACKGROUND OF THE INVENTION

This application claims the priority of Korean Patent Application No. 10-2004-0091573, filed on Nov. 10, 2004, in the Korean Intellectual Property Office, the disclosure of which is incorporated herein in its entirety by reference.

1. Field of the Invention

The present invention relates to an apparatus and method for detecting and visualizing anomalies in network traffic, and more particularly, to an apparatus and method for detecting anomalies and harmful traffic which are caused by direct and indirect results of cyber attacks occurring in a network or a defectiveness in constructing and operating the network and results in deterioration of network performance.

2. Description of the Related Art

In a conventional method for visualizing harmful traffic, the entire network traffic is usually visualized by being incorporated so that it is difficult to determine anomalies in traffic of a particular service. When harmful traffic is presented with respect to a port of a particular transport protocol, since a very large amount of data is required, difficulties lie in the processing speed and the presentation and analysis of an image. As a result, a manager oneself has to determine whether a particular traffic is normal or abnormal.

Also, since a presented traffic pattern image is very complicated, to automatically determine the existence of anomalies in a corresponding traffic, an image process technique is needed.

SUMMARY OF THE INVENTION

To solve the above and/or other problems, the present invention provides an apparatus and method for automatically determining the existence of anomalies by presenting the anomalies quickly and visually using simple data such as flow, octet, and packet numbers which can present traffic features for each port only to determine the existence of anomalies in traffic of each service, without the intervention of a manager.

According to an aspect of the present invention, an apparatus for detecting and visualizing anomalies in network traffic comprises a traffic information storing portion storing information on network traffic, a traffic state display portion presenting a status of the network traffic generated for a predetermined threshold time based on the information on network traffic on an orthogonal coordinates system in a form of a graph connecting at least one point data as a coordinate value, and a traffic anomalies determination portion determining an existence of anomalies in the network traffic based on a shape of the graph.

According to another aspect of the present invention, a method of detecting and displaying anomalies in a network traffic comprise receiving information on the network traffic, visualizing a status of the network traffic generated for a predetermined threshold time in a graph having point data as a coordinate value, based on the information, the point data being obtained in units of flow, packet, and octet of the network traffic, and determining whether there are anomalies in the network traffic based on the point data and a shape of the graph.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

To briefly summarize a concept of the present invention, a feature of traffic is presented in form of point data in a coordinate to monitor and display a movement of traffic in an entire network and service. Three quadrangular images are presented by connecting the above point data and whether the existence of anomalies in traffic is determined by analyzing the presented quadrangles. It is characteristic that the point data of a coordinate includes the number of flows, the number of packets, the amount of octet with respect to a direction of traffic and a connection duration time.

Figure 1:
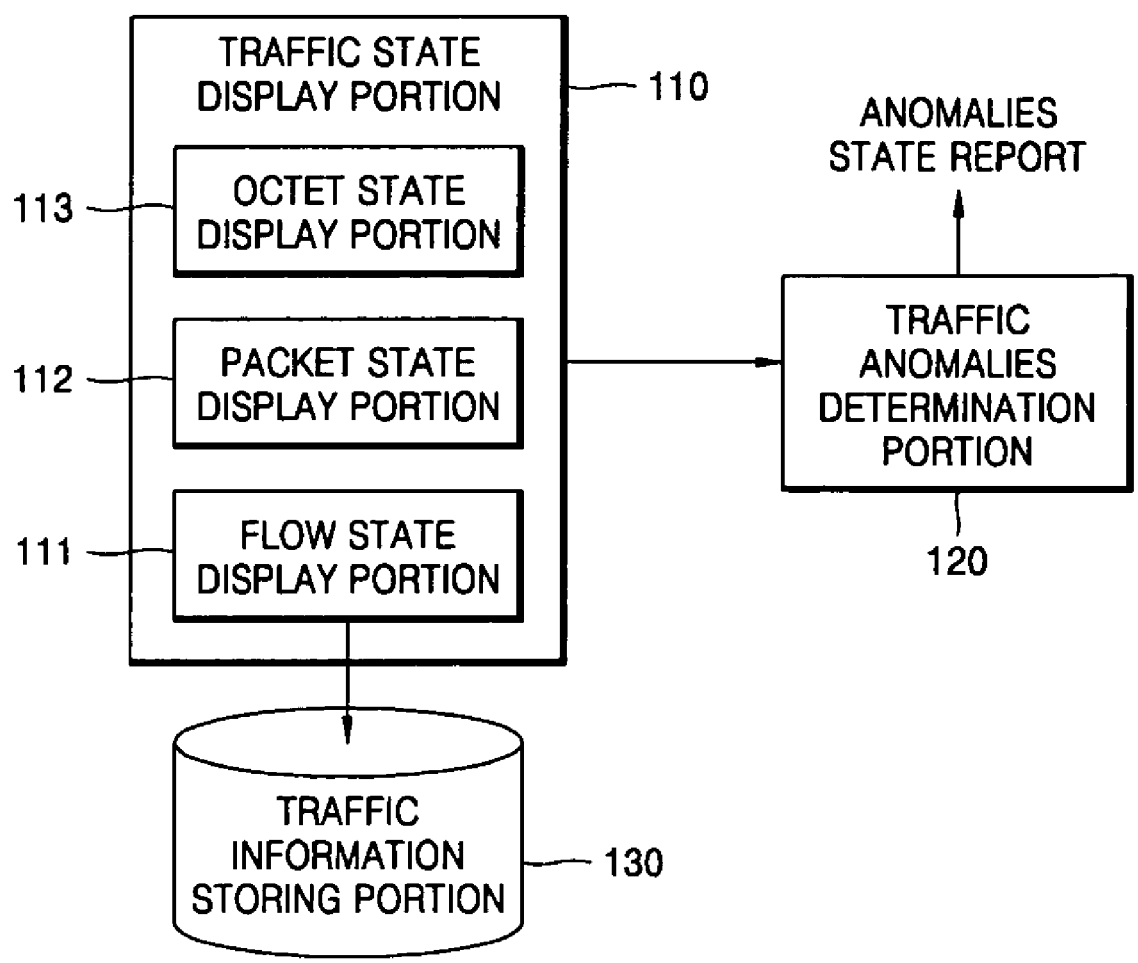
FIG. 1 is a block diagram illustrating a function of an apparatus for detecting and visualizing anomalies in a network traffic according to an embodiment of the present invention.
Figure 2:
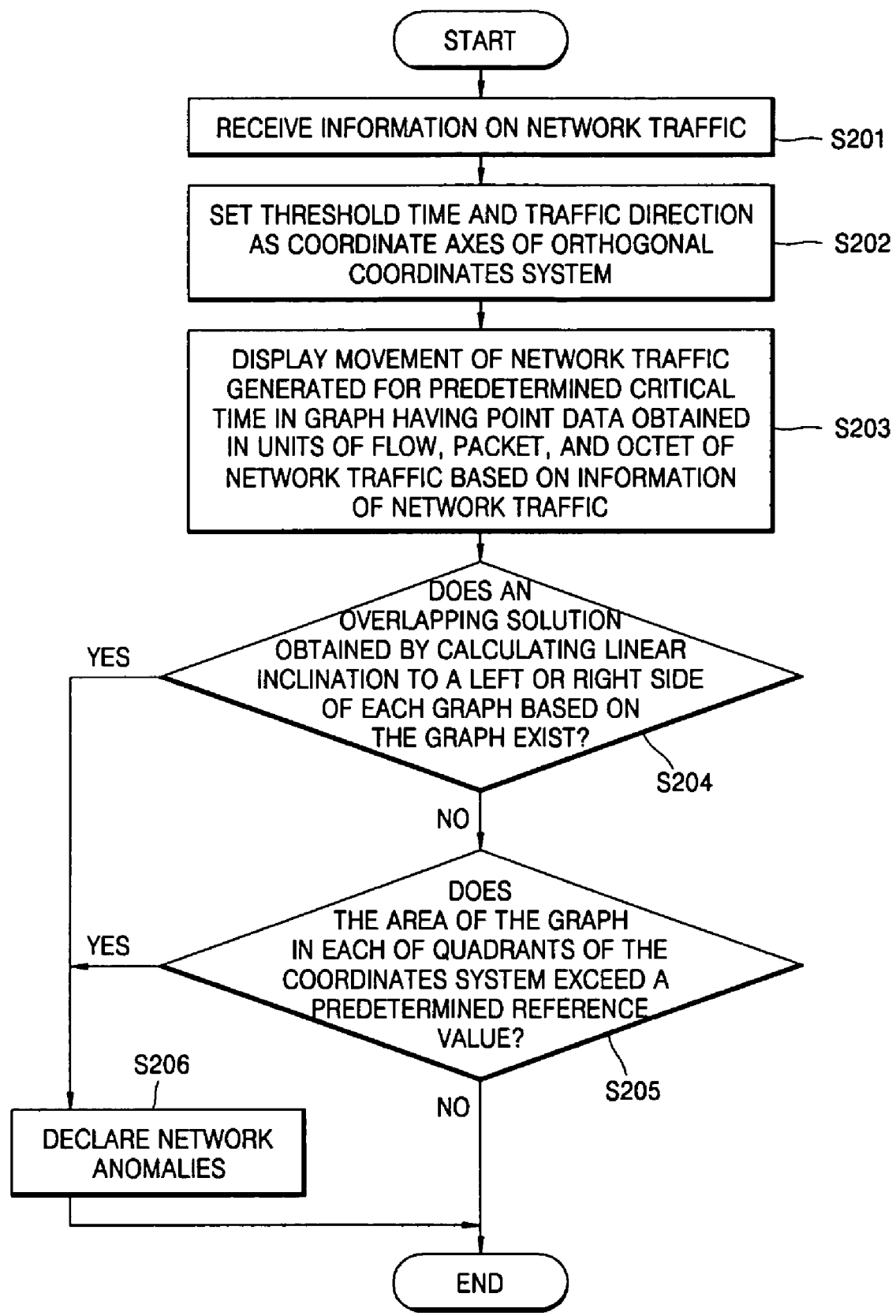
FIG. 2 is a flow chart for explaining a method for detecting and visualizing anomalies in a network traffic according to an embodiment of the present invention.

FIG. 1 is a block diagram illustrating a function of an apparatus for detecting and visualizing anomalies in a network traffic according to an embodiment of the present invention. Referring to FIG. 1, the apparatus for detecting and visualizing anomalies in a network traffic according to an embodiment of the present invention largely includes a traffic state display portion 110 and a traffic anomalies determination portion 120.

The traffic state display portion 110 displays the number of traffic flow, the number of packet, and the amount of octet flowing in or out of a collecting apparatus (not shown) on an orthogonal coordinates system in four points with respect to a predetermined threshold time.

Figure 3:
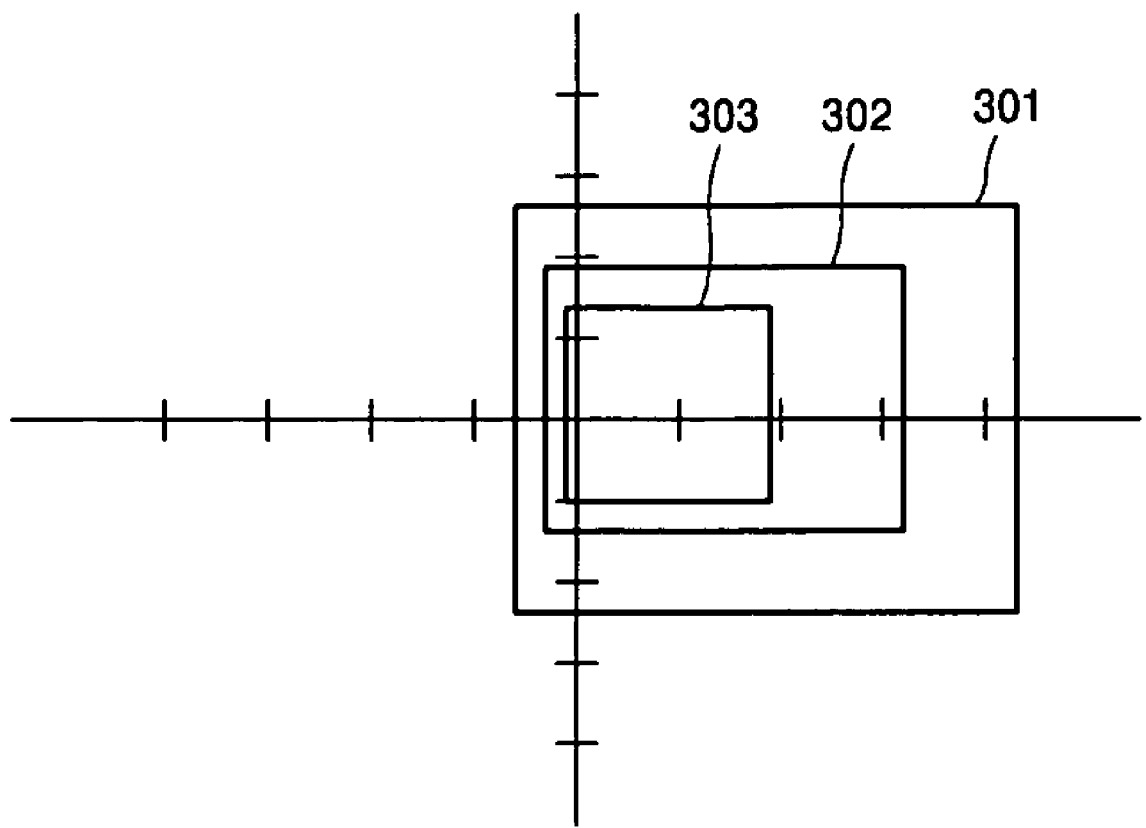
FIG. 3 is a view illustrating a normal state of a network traffic presented by the apparatus of FIG. 1.
Figure 4:
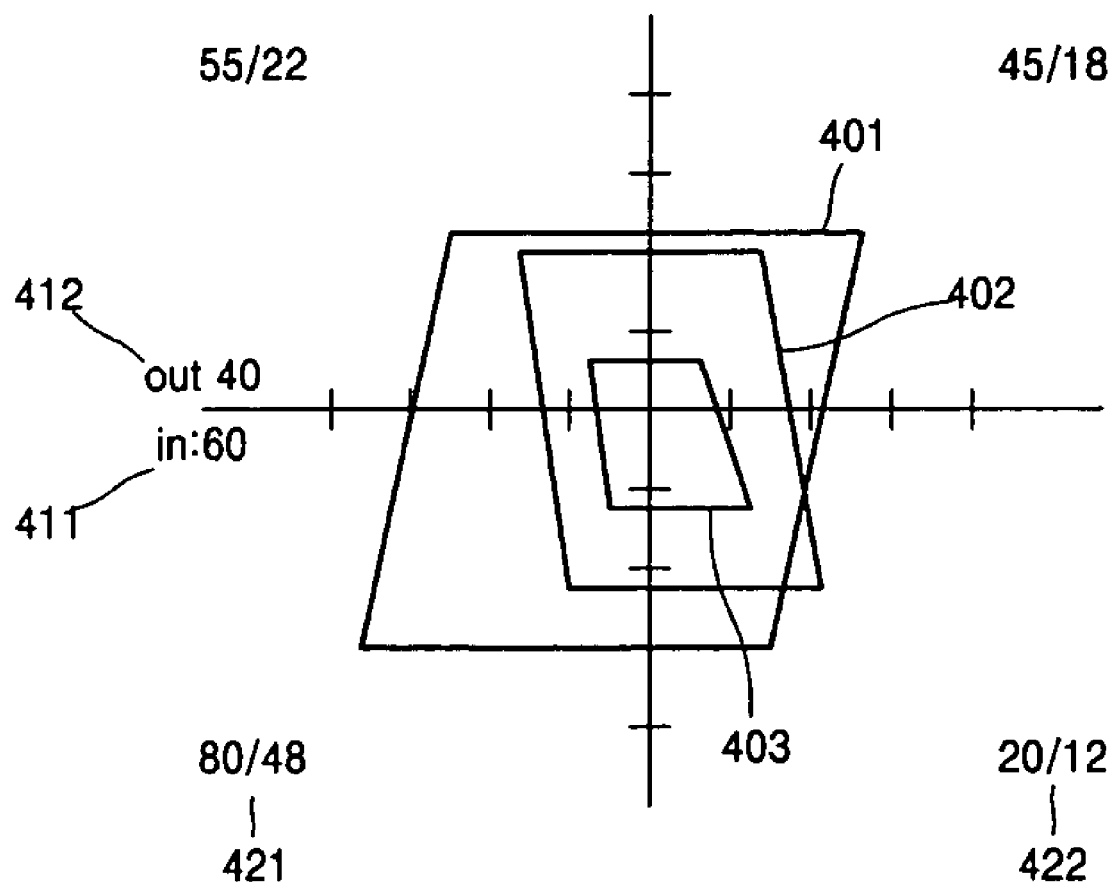
FIG. 4 is a view illustrating an anomalies of a network traffic presented by the apparatus of FIG. 1.

The traffic anomalies determination portion 120 determines the existence of anomalies in traffic from an area of a polygon and an overlapping area, and an inclination to the left or right side, of the quadrangular images 301, 302, and 303 of FIGS. 3 and 401, 402, and 403 of FIG. 4 in each of quadrants which are presented by three state display portions of a flow state display portion 111, a packet state display portion 112, and an octet state display portion 113.

In detail, the traffic anomalies determination portion 120 includes the flow state display portion 111, the packet state display portion 112, and the octet state display portion 113, and extracts the number of traffic flow, the number of packet, and the amount of octet generating for a predetermined threshold time, for example, less than a second, based on the traffic collected by a traffic information collector (not shown), that is, traffic information collected in a traffic information storing portion 130, and displays the extracted data on a 2-dimensional orthogonal coordinate by points.

FIG. 3 is a view illustrating a normal state of a network traffic presented by the apparatus of FIG. 1. When the content of each quadrant in a 2-dimensional orthogonal coordinates system is described with reference to FIG. 3, the first quadrant displays a state of output traffic of the collecting apparatus (not shown) maintaining a connection for over the threshold time and the second quadrant displays a state of output traffic maintaining the connection for less than the threshold time. In contrast, the third quadrant displays the state of input traffic maintaining the connection for less than the threshold time and the fourth quadrant displays the state of the input traffic maintaining the connection for over the threshold time. The coordinate axes of the quadrants on the orthogonal coordinates system, that is, the threshold time and the traffic direction, can be freely set and assigned.

The traffic flow state is displayed by the flow state display portion 111 as coordinate point data in each quadrant and, by connecting four coordinates point data, a graph 301 presented in a quadrangular form is displayed. The traffic packet and octet states are displayed in a packet state graph 302 and an octet state graph 303 by the traffic packet state display portion 112 and the octet state display portion 113 in the same method.

FIG. 4 is a view illustrating an anomalies of a network traffic presented by the apparatus of FIG. 1. Referring to FIG. 4, it can be seen that an input flow number 411 of the traffic collecting apparatus is greater than an output flow number 412 and a flow number 421 maintaining the connection for less than the threshold time is greater by far than a flow number 422 maintaining the connection for over the threshold time. Thus, a flow state graph 401 is inclined toward the third quadrant while the flow state graph 401 and a packet state graph 402 are overlapped with each other. The traffic anomalies determination portion 120 performs determination of the inclination of the graphs and a degree of overlapping. Also, since the overlapping and the inclination to the left or right side of a polygon presented in 2 dimensions can be easily determined using a mathematical formula according to whether the formula of two straight lines has a solution, an anomalies of traffic, that is, an attacked traffic by an automated network attack device or an excessive abnormal traffic due to a worm virus, can be automatically determined and monitored without an intervention of a manager.

Since the traffic state display portion 110 can quickly display a traffic state of a network using basic traffic information of three factors such as flow, packet, and octet, it is appropriate for presenting and processing a large amount of traffic in the current wide area network. Also, by presenting a traffic state in a network in a 2-dimension orthogonal coordinate, a user can easily detect and determined harmful traffic due to a virus such as a worm virus or abnormal attack traffic.

Also, the traffic anomalies determination portion 120 easily calculates the area of each graph in each quadrant according to a degree of the inclination and overlapping of a polygon presented in 2 dimensions and determines anomalies of a network according to whether the calculated area of the graph exceeds a reference area previously set. Thus, a solution which can develop a corresponding function into an automatic tool without an intervention of a manager is provided.

The method for detecting and visualizing anomalies in a network traffic according to an embodiment of the present invention is described below.

First, traffic information which is collected by the traffic collecting apparatus (not shown) and stored in the traffic information storing portion 130 is received (S201). As an assumption to present information on the flow number, the packet number, and the octet amount which are extracted from the traffic information, a predetermined threshold time that a user can arbitrarily set and the traffic direction are set as coordinate axes of an orthogonal coordinates system (S202). When the coordinate axes are set as above, the contents indicated by the respective quadrants are the same as those described above. That is, the first quadrant displays the state of output traffic of the collecting apparatus maintaining a connection for over the threshold time and the second quadrant displays the state of output traffic maintaining the connection for less than the threshold time. Also, the third quadrant displays the state of input traffic maintaining the connection for less than the threshold time and the fourth quadrant displays the state of the input traffic maintaining the connection for over than the threshold time.

To indicate a movement of traffic generated during the threshold time using the extracted network traffic information, point data is obtained in units of flow, packet, and octet of the network traffic and then a graph having the obtained point data as coordinate values is presented (S203). The result thereof is shown in FIGS. 3 and 4 and the anomalies are determined according to the shape of the graph as described below.

When a linear inclination to the left or right side of each graph is calculated based on the presented graph, whether an overlapped solution exists is determined (S204). Referring to FIG. 4, as described above, the flow state graph 401 is inclined toward the third quadrant and the flow state graph 401 and the packet state graph 402 are overlapped with each other. Accordingly, since the overlapping and the inclination to the left or right side of a polygon presented in 2 dimensions can be easily determined using a mathematical formula according to whether the formula of two straight lines has a solution, an anomalies of traffic can be automatically determined and monitored without an intervention of a manager.

Next, the anomalies of a network is determined by determining whether the area of the graph in each quadrant of the coordinates system exceeds a predetermined reference value (S205). When a solution exists in the steps 204 and 205 or the predetermined reference value is exceeded, anomalies of a network is declared and an action appropriate thereto is taken (S206).

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While this invention has been particularly shown and described with reference to preferred embodiments thereof, it will be understood by those skilled in the art that various changes in form and details may be made therein without departing from the spirit and scope of the invention as defined by the appended claims.

As described above, according to the apparatus and method for detecting and visualizing anomalies in network traffic according to the present invention, first, anomalies in traffic can be intuitively and quickly displayed using only the traffic base information. Second, the anomalies in traffic can be detected without an intervention of a user in determining the existence of anomalies in traffic for each time point. Third, not only the time for detecting anomalies in traffic is reduced, but also this method is programmed and systemized as a function to automatically correspond to anomalies in traffic.

What is claimed is:

1. An apparatus for detecting and visualizing anomalies in network traffic, the apparatus comprising:
   a traffic information storing portion storing information on network traffic;
   a traffic state display portion presenting a status of the network traffic generated for a predetermined threshold time based on the information on network traffic on an orthogonal coordinates system in a form of a graph connecting at least one point data as a coordinate value; and
   a traffic anomalies determination portion determining an existence of anomalies in the network traffic based on a shape of the graph; and
   the traffic anomalies determination portion calculates a linear inclination to a left or right side of each graph based on the graph and determines that there are anomalies in the network traffic when an overlapping solution exists.

2. The apparatus as claimed in claim 1, wherein the traffic state display portion comprises:
   a flow state display portion displaying a state of flow forming the traffic in a first graph;
   a packet state display portion displaying a state of packet forming the traffic in a second graph; and
   an octet state display portion displaying a state of octet forming the traffic in a third graph.

3. The apparatus as claimed in claim 2, wherein the point data includes a connection duration time of the flow, a transmitting/receiving address of the flow, a protocol identifier, a port number for each protocol, a number of the packet, an amount of the octet, and an interface number of a collecting apparatus that collects the packet.

4. The apparatus as claimed in claim 1, wherein the traffic state display portion sets the threshold time and a direction of traffic as coordinate axes of the orthogonal coordinates system.

5. A method of detecting and displaying anomalies in a network traffic, the method comprising:
   receiving information on the network traffic;
   visualizing a status of the network traffic generated for a predetermined threshold time in a graph having point data as a coordinate value, based on the information, the point data being obtained in units of flow, packet, and octet of the network traffic; and
   calculating a linear inclination to a left or right side of each graph based on the graph and determining that there are anomalies in the network traffic when an overlapping solution exists.

6. The apparatus as claimed in claim 5, wherein the visualizing of the movement of the network traffic comprises:
   setting the critical time and a direction of traffic as coordinate axes of orthogonal coordinate system; and
   obtaining and displaying a first graph indicating the flow, a second graph indicating the packet, and a third graph indicating the octet.

7. A computer-readable recording medium recording a program for causing a computer to perform a method of detecting and visualizing anomalies in a network traffic, the method comprising:
   receiving information on the network traffic;
   visualizing a status of the network traffic generated for a predetermined critical time in a graph having point data as a coordinate value, based on the information, the point data being obtained in units of flow, packet, and octet of the network traffic; and
   calculating a linear inclination to a left or right side of each graph based on the graph and determining that there are anomalies in the network traffic when an overlapping solution exists.

8. A method of detecting and displaying anomalies in a network traffic, the method comprising:
   receiving information on the network traffic;
   visualizing a status of the network traffic generated for a predetermined threshold time in a graph having point data as a coordinate value, based on the information, the point data being obtained in units of flow, packet, and octet of the network traffic;
   calculating a linear inclination to a left side or right side of each graph based on the graph;
   determining that there are anomalies in the network traffic when an area of the graph in each quadrants of the coordinates system exceeds a predetermined reference value.

9. An apparatus for detecting and visualizing anomalies in network traffic, the apparatus comprising:
   a traffic information storing portion storing information on network traffic;
   a traffic state display portion presenting a status of the network traffic generated for a predetermined threshold time based on the information on network traffic on an orthogonal coordinates system in a form of a graph connecting at least one point data as a coordinate value; and
   a traffic anomalies determination portion determining an existence of anomalies in the network traffic based on a shape of the graph; and
   the traffic anomalies determination portion determines that there are anomalies in the network traffic when an area of the graph in each of quadrants of the coordinates system exceeds a predetermined reference value.

* * * * *